(12) United States Patent
Deyerle et al.

(10) Patent No.: US 6,468,142 B1
(45) Date of Patent: Oct. 22, 2002

(54) METHOD AND APPARATUS FOR PROCESSING SQUID

(76) Inventors: Richard Deyerle, 598 Foam St., Monterey, CA (US) 93940; Daniel Deyerle, 598 Foam St., Monterey, CA (US) 93940

( * ) Notice: Subject to any disclaimer, the term of this patent is extended or adjusted under 35 U.S.C. 154(b) by 0 days.

(21) Appl. No.: 10/061,145

(22) Filed: Feb. 1, 2002

Related U.S. Application Data

(60) Provisional application No. 60/267,214, filed on Feb. 7, 2001.

(51) Int. Cl.[7] ............................................... A22C 29/04
(52) U.S. Cl. ............................ 452/20; 452/19; 452/18
(58) Field of Search ............................. 452/20, 19, 18

(56) References Cited

U.S. PATENT DOCUMENTS

| | | |
|---|---|---|
| 3,947,921 A | 4/1976 | Berk |
| 4,285,099 A | 8/1981 | Singh et al. |
| 4,329,761 A | 5/1982 | Olsson |
| 4,361,933 A * | 12/1982 | Rodman et al. ............... 452/20 |
| 4,446,601 A | 5/1984 | Carruthers |
| 4,528,720 A | 7/1985 | Young et al. |
| 4,545,092 A | 10/1985 | Olsson |
| 5,003,667 A | 4/1991 | Alinovi |
| 5,326,306 A * | 7/1994 | Katade et al. ................. 452/18 |

FOREIGN PATENT DOCUMENTS

| | | | |
|---|---|---|---|
| GB | WO 02/23996 A1 * | 3/2002 | |
| JP | 03119951 A * | 5/1991 | ................. 458/18 |

* cited by examiner

*Primary Examiner*—Peter M. Poon
*Assistant Examiner*—Joan M. Olszewski
(74) *Attorney, Agent, or Firm*—LaRiviere, Grubman & Payne, LLP

(57) ABSTRACT

A method and apparatus for processing squid whereby a squid is placed on a spike and is conveyed past a backstructure surface causing the squid to spin about the spike, the friction against the outside and the inside of the squid tube body causing the loosening and the removal of parts of the squid attached to the tube body, thereby cleaning the squid. The cleaning action can be enhanced by spraying the squid with water or air, and by drawing material away from the squid with a suction device.

20 Claims, 7 Drawing Sheets

METHOD AND APPARATUS FOR PROCESSING SQUID

CROSS REFERENCE TO RELATED APPLICATION

Priority is claimed to U.S. provisional patent application number 60/267,214, filed on Feb. 7, 2001, which is hereby incorporated by reference in its entirety.

BACKGROUND

Squid are caught in many waters of the world and are a source of food. The squid has a tube body covered on the outside with skin and fins. Inside the tube body are viscera and a pen or backbone. Attached near the opening of the tube body is a head with tentacles. The portions of the squid used for food are the tube body and the tentacles. Cleaning of squid has been a manual process, which requires the removal of the head and viscera from their attachment point inside the tube body, the removal of the skin and fins from the outside of the tube body, and the removal of the pen, which is embedded on the inside of the tube body. Persons skilled in the cleaning of squid are becoming more difficult to find and more expensive to employ. Often, freshly caught squid are frozen and shipped great distances to areas of inexpensive labor where they are thawed, cleaned, frozen again, and shipped to market.

There are designs for machines to clean squid known in the art, although it is not known that any machine is in wide commercial use. These machines tend to be mechanically complex, making them unsuitable for use in a seafood processing environment. Some of the machines have sharp blades and other features that make them dangerous to be used by semi-skilled labor in a seafood processing environment.

An improved method and apparatus for processing squid is needed in order to lower the cost and increase the supply of edible squid.

SUMMARY OF INVENTION

The present invention is a method and apparatus for processing squid. A squid is placed on a spike and is conveyed past a backstructure surface causing the squid to spin about the spike, the friction against the outside and the inside of the squid tube body causes the loosening and the removal of parts of the squid attached to the tube body, thereby cleaning the squid. The cleaning action can be enhanced by spraying the squid with water or air, and by drawing material away from the squid with a suction device.

DISCLOSURE OF INVENTION

Figure 1:
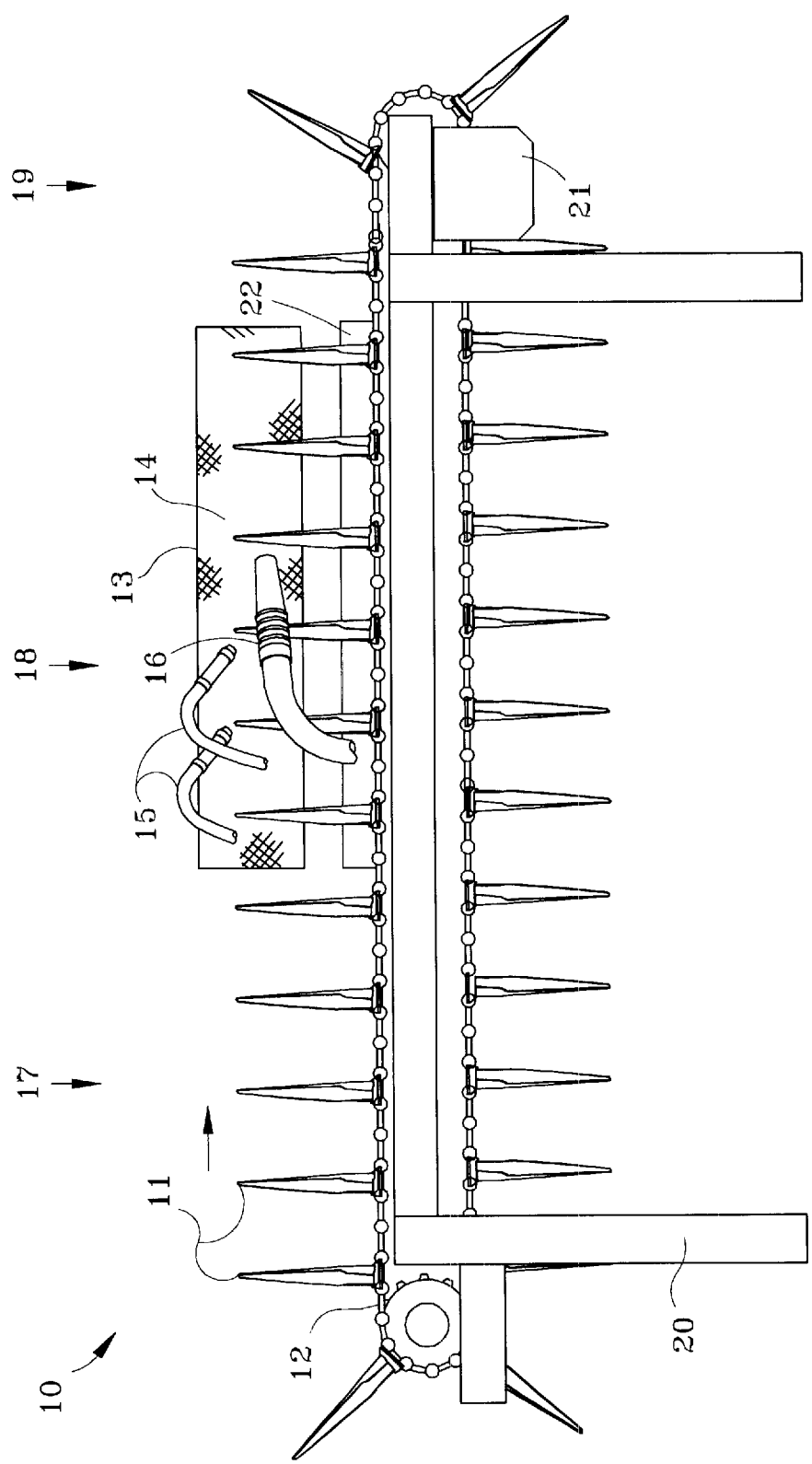
FIG. 1 is a side view of an embodiment of the invention.

The Squid Processing Apparatus 10, as shown in FIG. 1, comprises a number of spikes 11 which are attached to and moved on a conveyor 12 in close proximity to a backstructure 13 which has a backstructure facing 14. Jets 15 of water or air are arranged to spray toward the spikes. A suction device 16 is arranged to draw debris away from the spikes. The spikes move along a line of conveyance through an intake zone 17, followed by a cleaning zone 18, followed by a discharge zone 19.

The apparatus is arranged on a frame 20. A motor 21 is provided to move the conveyor and the attached spikes. A hold-down bar 22 is provided to prevent the spikes from being pushed away from vertical in the cleaning zone.

Unprocessed squid are placed on the spikes 11 in the intake zone 17 of the apparatus. The squid are cleaned and processed in the cleaning zone 18. Processed squid tubes fall or are otherwise removed from the spikes in the discharge zone 19.

Figure 2:
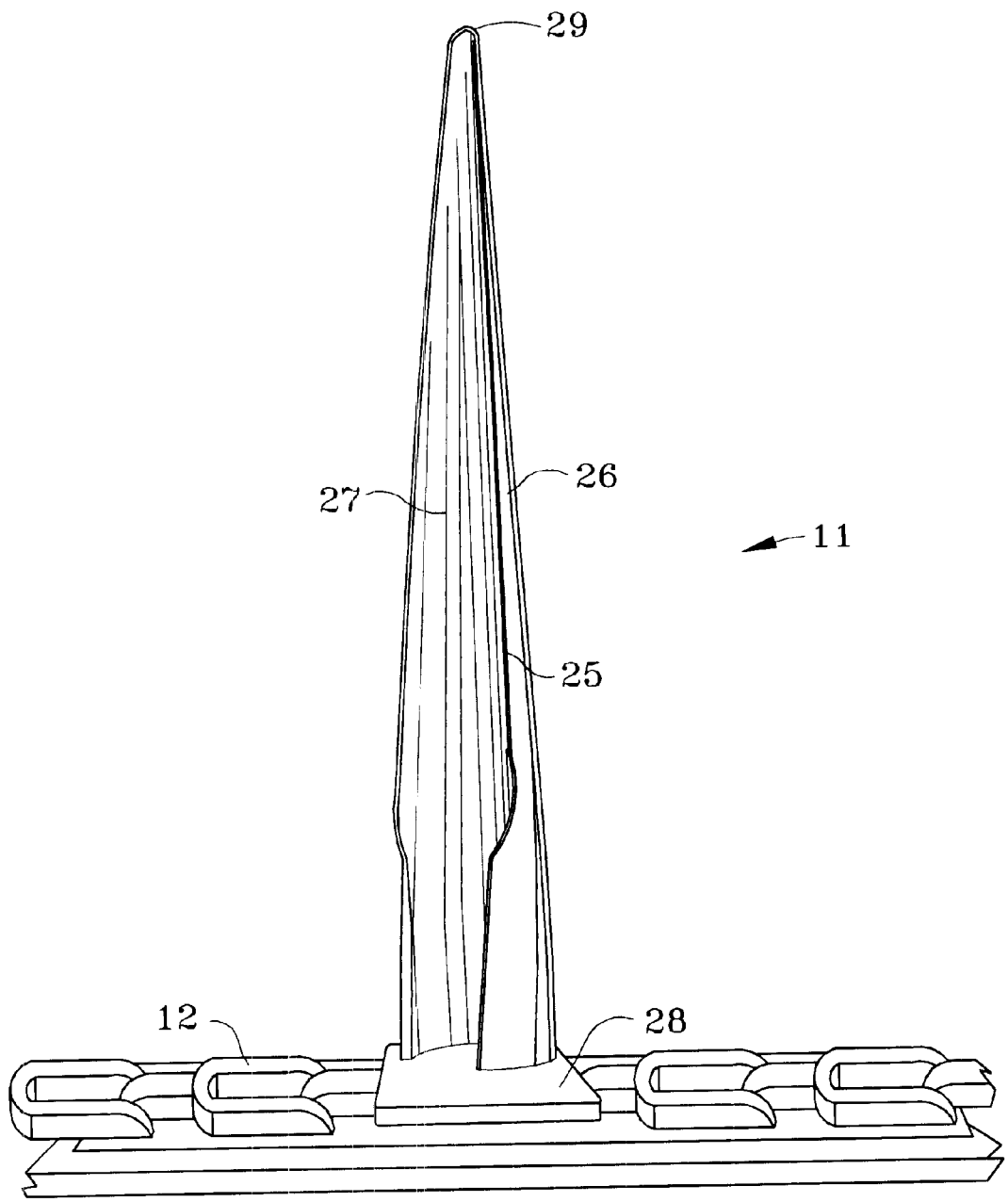
FIG. 2 is a detailed side view of a spike coupled with a segment of conveyor of the invention.
Figure 8:
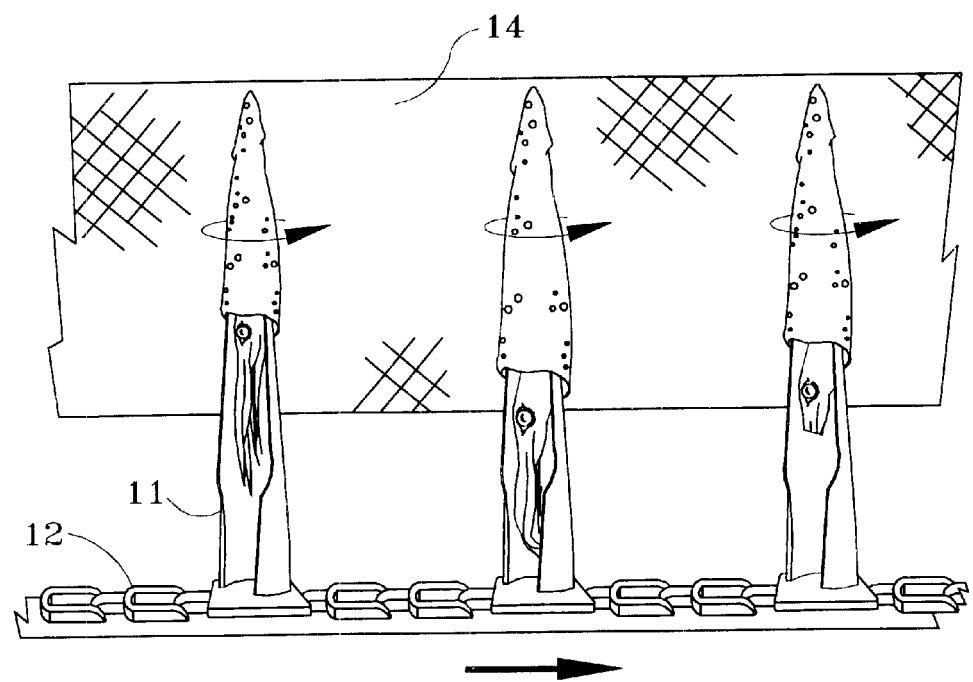
FIG. 8 is a side view of three squid within the cleaning zone of the invention.

A spike is shown in detail in FIG. 2. Each spike 11 is generally in the shape of a partially cut away cone. The size of the spike can be approximately the average size of the species of squid to be processed. In an embodiment configured for the loligo opalescens species of squid, the spike is approximately 9 inches long and approximately 2 inches at its maximum width or diameter. The exact size of the spike is not critical because smaller squid will be accommodated on the smaller upper portion of the spike, and larger squid will extend down to the larger lower portion of the spike, as is illustrated in FIG. 8. Because of this, size grading of squid is not necessary before processing with this invention.

Each spike has an outer surface 26 and an inner surface 27. An edge 25 between the outer surface and inner surface will serve to scrape the viscera and pen from inside the squid tube and to shear the squid's head from the tube. This edge does not need to be particularly sharp. A slight degree of sharpness is effective. An edge having a right angle is sufficiently sharp. The tip end 29 of the spike comes to a slightly rounded point, which is not so sharply pointed as to pierce the tube of the squid but is pointed enough to facilitate the easy placement of the squid on the spike in a manner to be described below. The wide end of the spike has a baseplate 28 which is attached to the conveyor 12.

The spikes are made of a durable and cleanable material suitable for use in a food processing environment. Stainless steel is one appropriate material with which to make the spikes. In a functioning prototype of the invention, the spikes were constructed by welding baseplates onto commercially available steel fids of the type normally used to splice ships' lines.

The baseplates 28 of the spikes 11 are attached to a conveyor 12, such as a conveyor belt made of hard plastic links which are formed into an endless loop. The conveyor should be durable and cleanable. Such conveyors suitable for use in a food processing environment are commercially available.

The spikes 11 are attached to a point on the conveyor 12 in such a way that they move with the conveyor, but do not move in relation to their point of attachment to the conveyor. The spikes do not rotate about their long axis or otherwise move except for their movement with the conveyor along a line of conveyance. This greatly simplifies the present invention in relation to devices having rotating spikes and other complex moving parts, making the present invention easier and less expensive to manufacture and more reliable to operate.

Because the tip end 29 of the spike is not sharply pointed, the edge 25 between the outer and inner surfaces of the spike is not extremely sharp, and the spike is not rotating, a person tending the invention and wearing heavy rubber gloves is unlikely to be injured by the invention.

Figure 3:
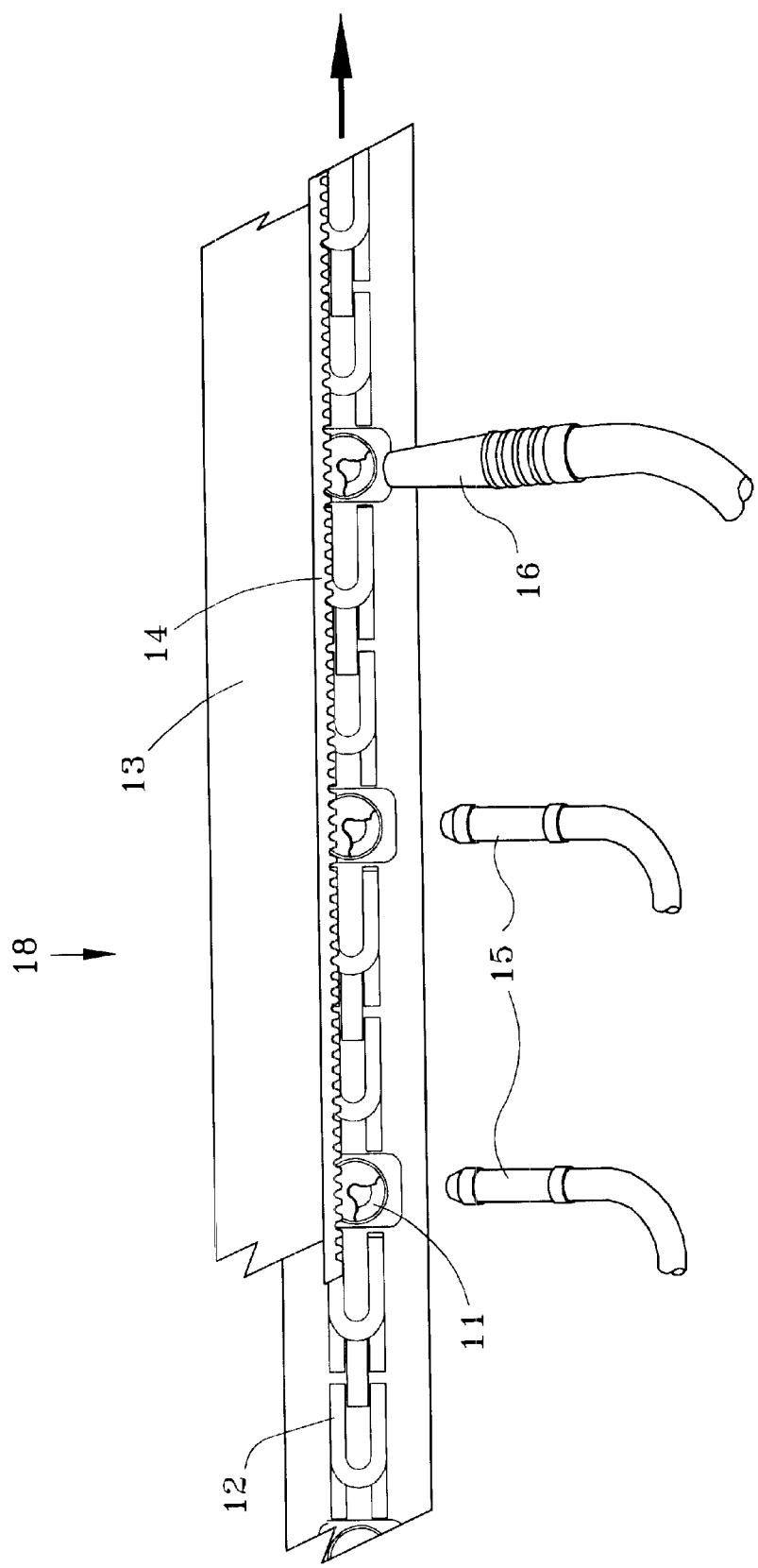
FIG. 3 is a detailed top view of the cleaning zone of the invention.

Referring now to FIG. 3, a backstructure 13 having a backstructure facing 14 is arranged in close proximity to the line of spikes 11 on the conveyor 12. The backstructure 13 is made of a structural material such as steel. The backstructure facing 14 may be of a material such as textured rubber or plastic. Optionally, the backstructure 13 may be given a textured surface and the backstructure facing may be omitted. The backstructure is arranged parallel to the line of conveyance of the spikes in the cleaning zone 18 of the invention. The backstructure is arranged to be close to the line of spikes and to follow the angle of the spikes as shown below.

Squid placed on the spikes will make frictional contact with the backstructure facing and will be spun around the spikes as shown below. The friction of the outer surface of the squid against the backstructure facing and the inner surface of the squid against the spike effect the cleaning process as shown below. One or more jets 15 of water or air may optionally be directed toward the line of conveyance of the spikes within the cleaning zone. Such jets aid the cleaning process and serve to flush away the removed parts of the squid. One or more suction devices 16 may optionally be directed toward the line of conveyance of the spikes within the cleaning zone. Such a suction device insures the removal of parts of the squid.

Figure 4:
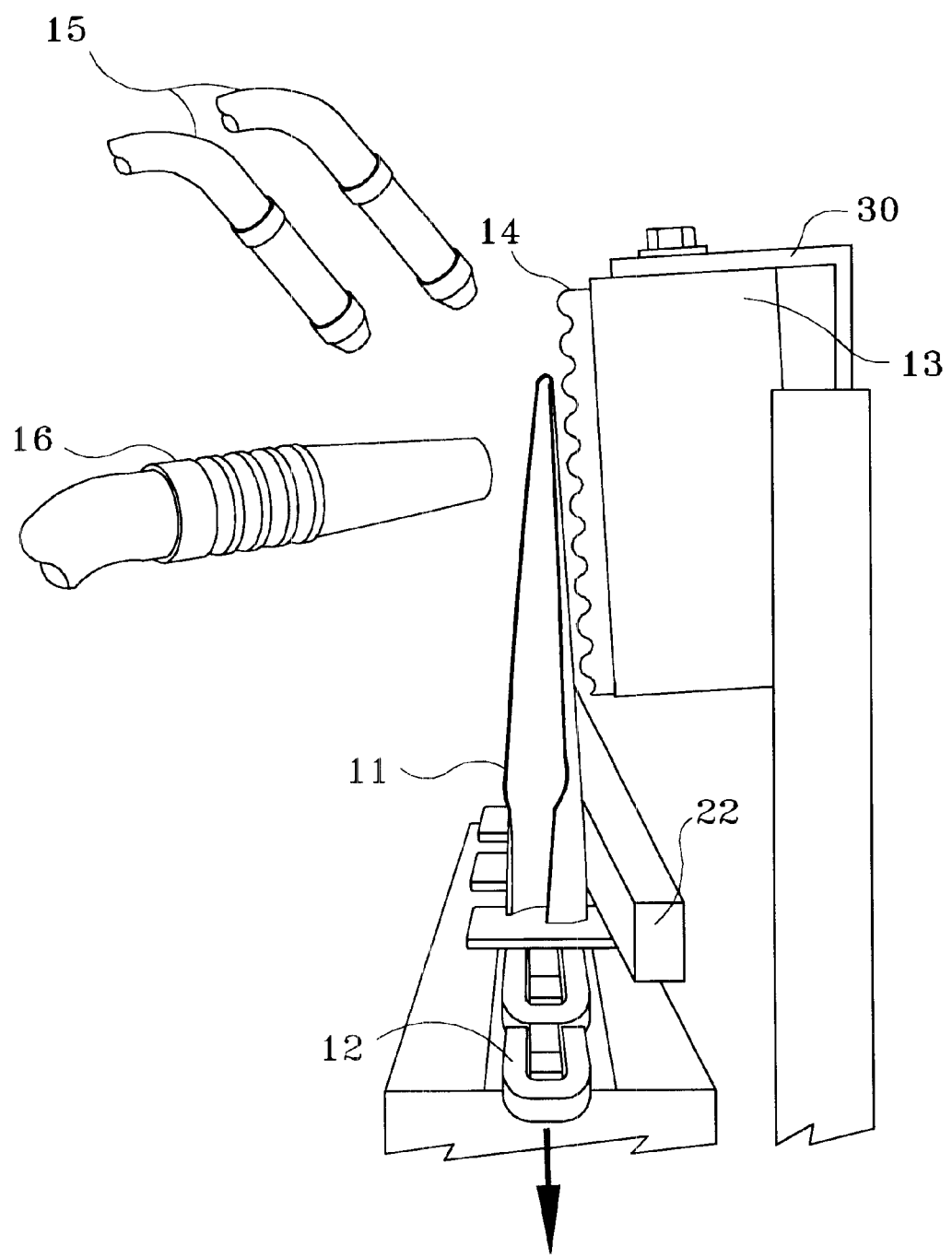
FIG. 4 is an end view in partial section of the cleaning zone of the invention.

Referring now to FIG. 4, the backstructure 13 and backstructure facing 14 are arranged in close proximity to the spikes 11, following both the line of conveyance of the spikes and the angle of the spikes, so that the backstructure facing is at a generally equal distance from all points of the outer surface of each spike in a line of spikes within the cleaning zone. Optionally, an adjustable support bracket 30 may be provided to set and maintain the angle of the backstructure and its proximity to the line of spikes. The distance from the backstructure facing to the spikes is less than the average thickness of the flesh of the squid's tube body. The backstructure facing should be close enough that it makes contact with the outside of the tube body of a squid placed on the spike, but not so close that it tears the tube body of the squid.

Optionally, a hold-down bar 22 is arranged so that a portion of the baseplate of the spike 11 moves under the hold-down bar 22 while the spike is traveling through the cleaning zone. The hold-down bar counteracts the force of the backstructure pressing against the squid tube body and against the spike, thereby keeping the spike from being pushed out of vertical.

An advantage of a flexible rubber or plastic backstructure facing, especially one having flexible protrusions from its surface, is that it may be positioned closely to the spikes and provide a high degree of friction, yet be flexible enough to avoid tearing the tube of the squid. Another advantage of a flexible rubber or plastic backstructure facing is that it adapts to variations in the thickness of squid tubes being processed.

Referring again to FIG. 1, at the intake zone 17 of the apparatus there is no backstructure behind the first few spike locations. This is to allow the placement of squid on the spikes, which the backstructure would interfere with. Within the cleaning zone 18, the backstructure 13 is placed in such a way as to be in close proximity to the spikes as described above. The vertical length and vertical placement of the backstructure is not critical, since it is not necessary that the backstructure contact all of the tube of the squid. In tests, the apparatus has been effective even when twenty-five percent of the squid tube was not in contact with the backstructure.

Figure 5:
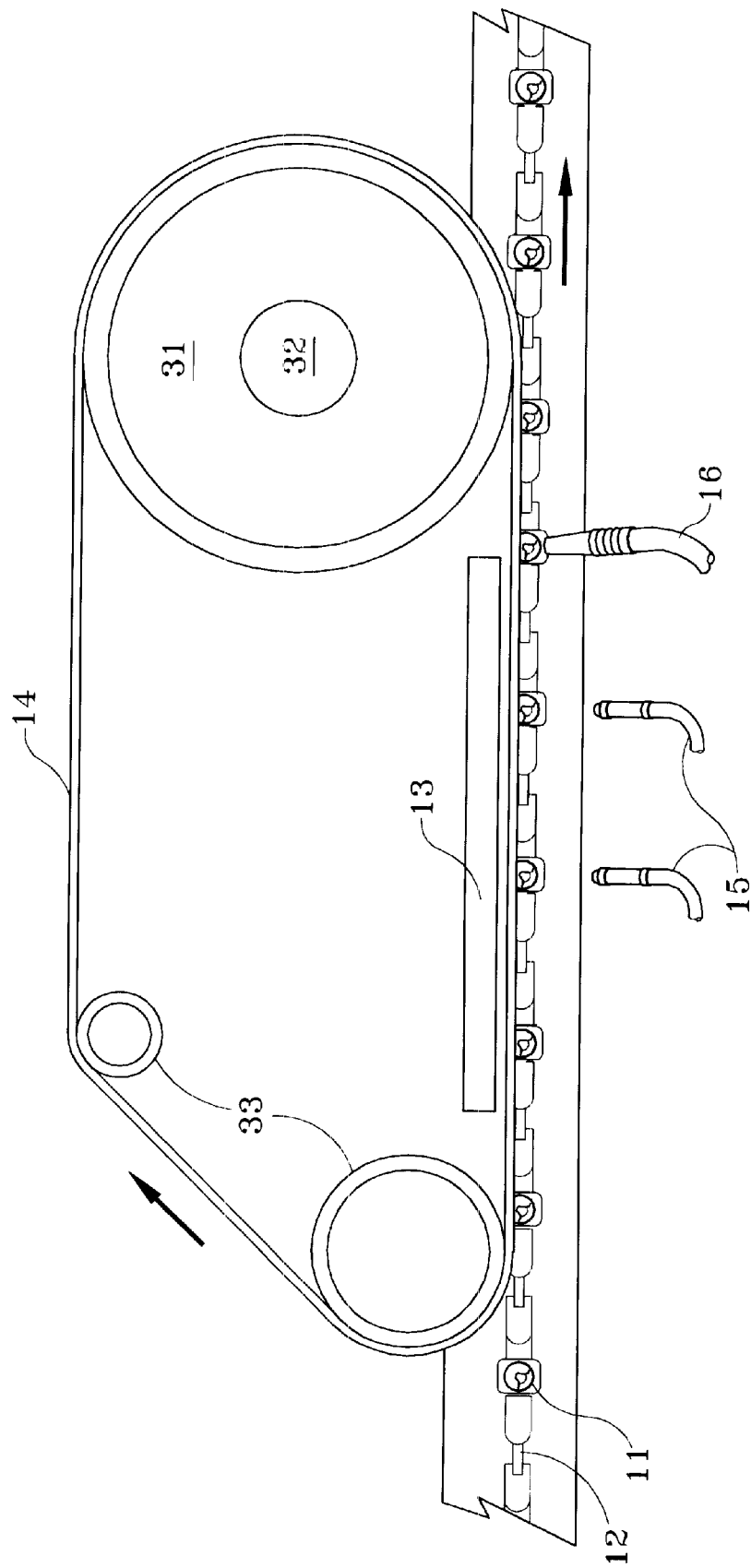
FIG. 5 is a partial top view of an embodiment of the invention having a moving back-surface.

FIG. 5 shows a view from above of the cleaning zone of the invention having an embodiment of the backstructure 13 and backstructure facing 14 where the backstructure facing 14 moves in a direction opposite the direction of conveyance of the spikes. The backstructure 13 is fixed in place. The backstructure facing 14 is an endless belt which loops around a drive drum 31 which is driven by a motor 32, and around one or more passive drums 33. An advantage of this embodiment is that the squid will spin more revolutions at a faster speed over a given length of travel, and will therefore spin more and spin faster while under a jet 15 or suction device 16. Also the moving backstructure facing 14 will be continually flushed by moving under the jets 15.

Figure 6:
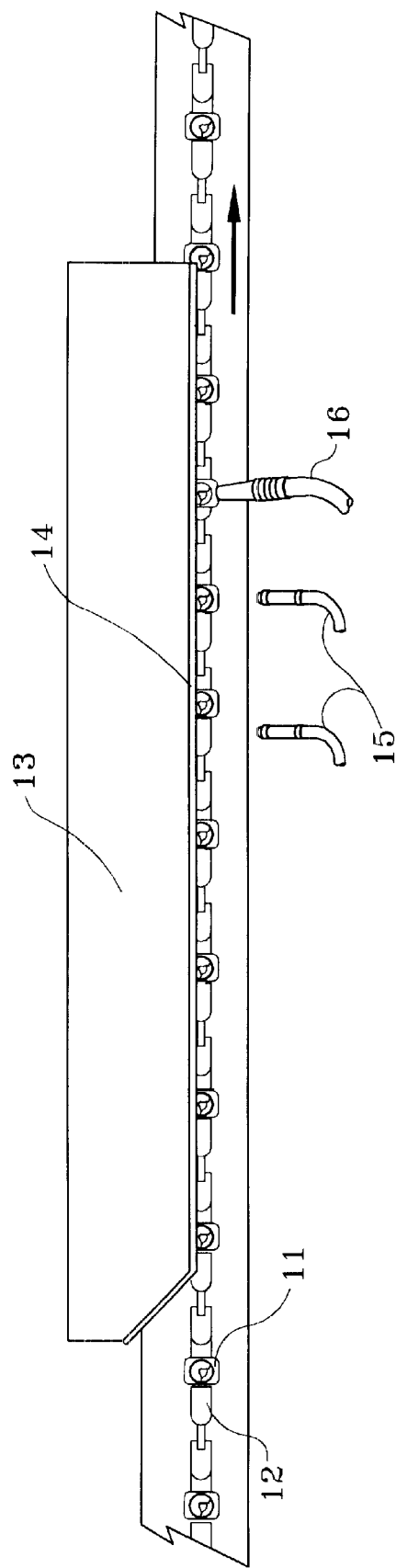
FIG. 6 is a partial top view of an embodiment of the invention having a stationary back-structure.

FIG. 6 shows a view from above of the cleaning zone of the invention having an embodiment of the backstructure 13 and backstructure facing 14 where both are stationary. An advantage of this embodiment is its simplicity, with no additional motors or moving parts.

The horizontal length of the backstructure is not critical. In functioning prototypes of the invention, a horizontal length of approximately four feet was found to be effective for a stationary backstructure and a horizontal length of approximately three feet was found to be effective for a moving backstructure.

The traveling speed of the spikes along the line of conveyance is not critical. In a functioning prototype of the invention, a speed which moved a spike past a point every two or three seconds was found to be effective.

The present invention separates the head and viscera from inside the tube of the squid, and loosens the skin and fins from the outside of the tube of the squid largely by friction against the spike on the inside and the backstructure facing on the outside. The removal of the skin and fins can be enhanced by jets of water or air and by suction devices. The flushing away of skin, fins, heads, and viscera can also be accomplished by these same jets and suction devices. The use of air jets instead of water jets would be appropriate in a processing environment with a restricted water supply. The number of water jets and suction devices are not critical to the basic operation of the present invention.

Referring again to FIG. 1, jets 15 and suction devices 16 are provided in order to further the processing of the squid. In an embodiment, two jets 15 and one suction device 16 are arranged on the apparatus. The jets are placed generally perpendicular to the backstructure, and spray a fan spray of water or air toward the spikes in such a way that the spray contacts and helps strip the skin from the tubes of squid placed on the spikes.

In this embodiment, a suction device 16 is placed near the spikes in a location nearer the discharge zone 19 of the apparatus than the jets. This suction device is placed close to the tip end of the spikes and functions to insure the removal of any fins and skin that may still be attached, and to carry away fins and skin from the outside of the squid tube. Another suction device could be placed close to the baseplate end of the spikes which would function to carry away the head and viscera that have been separated from the inside of the squid tube. Suction devices are arranged to draw at an angle downward, since any drawing upward would tend to remove the squid tube from the spike.

The tentacles of the squid may be removed manually or by some other process before the squid are placed on the present invention. The tentacles may also be retrieved from the heads separated from the squid tube by the present invention.

Figure 7:
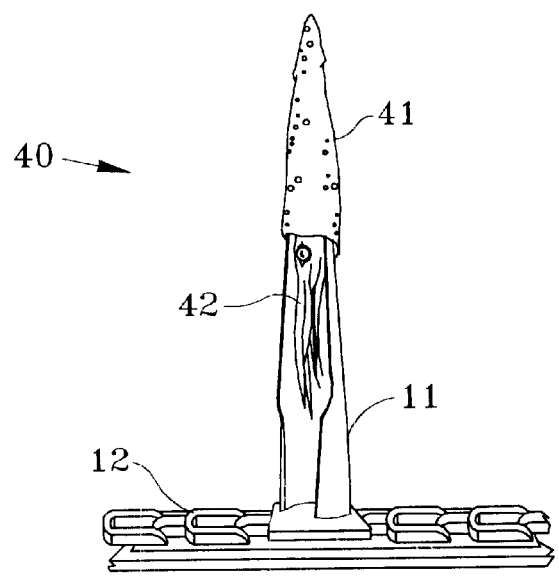
FIG. 7 is a side view of a squid placed upon a spike of the invention.

FIG. 7 shows a squid 40 placed on a spike 11. The tube body 41 envelops the tip portion of the spike. The head and tentacles 42 hang within the cutaway portion of the spike. Since the squid's head is attached to the tube body at only one point, the squid can be slipped onto the spike without having to pierce the squid. It is not necessary to place the squid in any particular position in relation to the cutaway portion of the spike, since later spinning of the squid against the backstructure will ensure that the squid's head and viscera are moved into the cutaway portion. The placement of the squid on the spikes may be performed by unskilled labor.

FIG. 8 shows three squid of varying sizes placed on spikes 11 on a conveyor 12 being conveyed past a backstructure facing 14. The spinning of the tube bodies of the squid is indicated. As the tube body spins about the spike, the head, viscera, and pen of the squid are brought into frictional contact with the edge of the spike and with the other surfaces of the spike. This frictional contact separates the head, viscera, and pen from the tube body of the squid. The frictional contact of the skin and fins against the backstructure facing separates the skin and fins from the tube body.

In operation, referring to FIG. 1, squid are placed on spikes 11 within the intake zone 17 of the present invention. The squid on the spikes 11 are conveyed through the cleaning zone 18 past the backstructure 13 and backstructure facing 14 which makes contact with the outside of the squid tube body and causes the squid to spin around the spike. This spinning action separates the head, viscera, and pen from the inside of the tube body. The friction of the squid against the backstructure facing loosens the skin and fins from the outside of the tube body. This loosening may be furthered by jets 15 of water or air and by suction devices 16. Suction devices 16 may be used to carry away the heads, viscera, skin, and fins. Further water jets 15 may be used to rinse the squid tube bodies. The processed squid tube bodies fall off the spikes within the discharge zone 19 or can be removed by suction, water, air, or by a mechanical device to push them off. Optionally, a slicing device located in the discharge zone may cut the tubes.

While this invention has been described in detail with particular reference to its preferred embodiments, the principles and modes of operation of the invention have also been described in this specification. The invention should not be construed as being limited to the particular forms disclosed, which are illustrative rather than restrictive. Modifications, variations, and changes may be made by those skilled in the art without departure from the spirit and scope of the invention as described by the following claims.

We claim:

1. An apparatus for processing squid, the squid having a tube body and inedible parts attached to said tube body, the apparatus comprising:
    a frame;
    a conveyor arranged on said frame and traveling in a loop along a line of conveyance;
    a plurality of spikes for receiving said squid, each spike having a general shape of a partially cut-away cone and having a long axis, a base at one end of said long axis, an outer surface, an inner surface, and an edge between said outer surface and said inner surface, wherein said base of said spike is coupled with said conveyor so that said long axis is generally perpendicular to said line of conveyance and so that each spike travels on said conveyor along said line of conveyance without rotating about said long axis; and
    a backstructure facing arranged on said frame in close proximity to said spikes along said line of conveyance such that said squid placed on said spike will be in frictional contact with said backstructure facing, causing said squid to spin about said spike, thereby separating said inedible parts from said tube body.

2. The apparatus for processing squid of claim 1, further comprising at least one jet for spraying a substance selected from the group consisting essentially of water and air, said jet being arranged to spray toward said spike.

3. The apparatus for processing squid of claim 1, further comprising at least one suction device arranged to draw material away from said spike.

4. The apparatus for processing squid of claim 1, further comprising at least one jet for spraying a substance selected from the group consisting essentially of water and air, said jet being arranged to spray toward said spike, and at least one suction device arranged to draw material away from said spike.

5. The apparatus for processing squid of claim 1, said spike being made of at least one material selected from the group consisting essentially of metal, ceramic, and hard plastic.

6. The apparatus for processing squid of claim 1, said backstructure facing being made of at least one material selected from the group consisting essentially of rubber and plastic.

7. The apparatus for processing squid of claim 1, further comprising a hold-down bar arranged on said frame to counteract forces against said spike.

8. The apparatus for processing squid of claim 1, said conveyor further comprising a conveyor belt driven by a motor.

9. The apparatus for processing squid of claim 1, said backstructure facing being arranged to move in a direction opposite said direction of conveyance.

10. The apparatus for processing squid of claim 4, said spike being made of at least one material selected from the group consisting essentially of metal, ceramic, and hard plastic.

11. The apparatus for processing squid of claim 4, said backstructure facing being made of at least one material selected from the group consisting essentially of rubber and plastic.

12. The apparatus for processing squid of claim 4, said conveyor further comprising a conveyor belt driven by a motor.

13. The apparatus for processing squid of claim 4, said backstructure facing being arranged to move in a direction opposite said direction of conveyance.

14. An apparatus for processing squid, the squid having a tube body and inedible parts attached to said tube body, the apparatus comprising:
    a plurality of spike means for receiving said squid;
    conveyor means for conveying said spike means along a line of conveyance, wherein said spike means is coupled with said conveyor means so that each spike means travels on said conveyor means along said line of conveyance without rotating of said spike means; and
    a backstructure facing means for facilitating spinning of said squid, said backstructure facing means arranged close proximity to said spike means along said line of conveyance such that said squid placed on said spike means will be in frictional contact with said backstructure facing means, causing said squid to spin about said spike means, thereby separating said inedible parts from said tube body.

15. The apparatus for processing squid of claim 14, further comprising at least one jet means for spraying a substance selected from the group consisting essentially of water and air, said jet means being arranged to spray toward said spike.

16. The apparatus for processing squid of claim 14, further comprising at least one suction device means arranged to draw material away from said spike.

17. A method for processing squid, the squid having a tube body and inedible parts attached to said tube body, the method comprising:

placing said squid on a non-rotating spike arranged on a conveyor;

conveying said squid on said spike past a backstructure facing which makes frictional contact with said squid causing said squid to spin about said spike, thereby separating said tube body of said squid from said inedible parts.

18. The method of claim 17, further comprising spraying said squid on said spike with a substance selected from the group consisting essentially of water and air.

19. The method of claim 17, further comprising drawing material away from said squid on said spike with a suction device.

20. The method of claim 17, further comprising spraying said squid on said spike with a substance selected from the group consisting essentially of water and air, and drawing material away from said squid on said spike with a suction device.

* * * * *